July 3, 1945.  W. R. FETZER  2,379,427
MANUFACTURE OF DEHYDRATED COFFEE
Filed Oct. 31, 1942
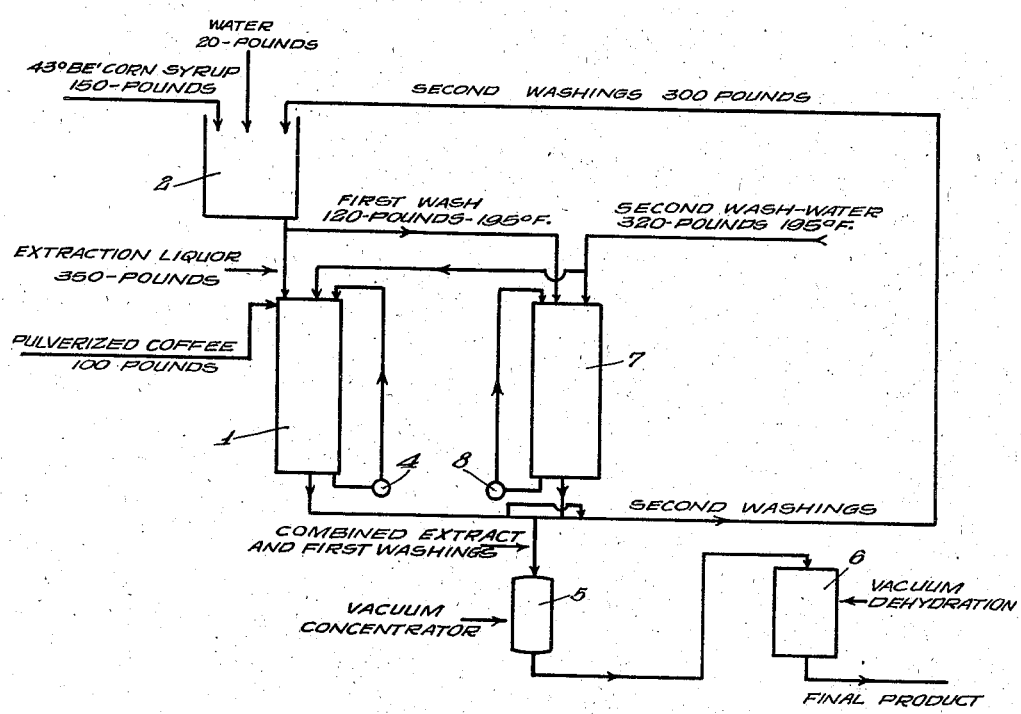
INVENTOR.
WALTER R. FETZER
BY
ATTORNEYS Patented July 3, 1945

2,379,427

UNITED STATES PATENT OFFICE 2,379,427

MANUFACTURE OF DEHYDRATED COFFEE

Walter R. Fetzer, Clayton, Mo., assignor to Union Starch & Refining Company, Columbus, Ind., a corporation of Indiana Application October 31, 1942, Serial No. 464,092

6 Claims. (Cl. 99—71)

This invention relates to a process for manufacturing solid dehydrated coffee whereby the desirable flavor and aroma constituents are largely retained by the use of an aqueous corn syrup percolating medium in a cyclic process.

Solid coffee concentrates from which coffee can be made by the addition of hot water have been previously suggested in the art. They have, however, been largely unacceptable because they lack the flavor and aroma constituents of coffee freshly made by the customary percolating or brewing processes. This loss of flavor and aroma constituents constitutes the most serious single problem in the manufacture of coffee concentrates.

In all of the processes of forming a solid coffee concentrate the volatile constituents which produce the aroma and flavor of coffee are largely lost by volatilization during the manufacturing process.

Although attempts have been made to recapture the volatilized constituents and later join these fractions to the coffee base for subsequent dehydration, a large portion of the volatiles still are lost and the apparatus for collection of this volatile fraction is rather cumbersome and does not lend itself to a simple continuous process.

It is the object of the present invention to extract and retain the volatile and non-volatile portions of the coffee flavor in the manufacture of a solid coffee concentrate.

It is a further object of the present invention to reduce the vapor pressure of the liquid coffee mix which, in turn, reduces the losses of the desirable volatile constituents.

It is a further object of the present invention to retain the desirable flavor and aroma constituents by the use of a fixative agent.

It is a further object of the present invention to provide a process for the dehydration of coffee in which the amount of evaporation necessary to carry the concentrate to dryness is reduced.

Other objects of this invention will be apparent from the specific description of the process set forth hereinafter.

These objects are accomplished by employing corn syrup or a mix of corn syrup and water as the extraction medium used in a simple counter current process to extract the necessary coffee components from solid ground coffee beans. The corn syrup, containing as it does the reducing sugars maltose and dextrose, fixes to a marked degree the volatile aroma and flavor constituents, in addition to serving as a base for the dehydration of the coffee to solid form.

By using corn syrup as an extracting medium the amount of evaporation necessary and the vapor pressure of the mix is also reduced which, in turn, substantially reduces the losses of the volatile constituents.

The counter current process of extraction which will be specifically discussed hereinafter is diagrammatically illustrated in the flow sheet of the attached drawing.

The process is as follows: 100 pounds of pulverized coffee beans are placed in the percolator 1. 350 lbs. of an extraction liquor is delivered from tank 2 into the percolator 1, the extraction liquor being made up of 150 lbs. of 43 Bé. regular corn syrup referred to in the art as C. S. U., 20 lbs. water and 300 lbs. washings which are obtained from a rewash of the residual ground coffee solids from a previous run, as will be set out more specifically hereinafter. This combination makes more than the 350 lbs. of extraction liquor delivered to percolator 1, but the remainder is utilized as will be shown later. The percolator 1 is jacketed and the extraction liquor comprising corn syrup, water and coffee washings is circulated through the percolator 1 by pump 4 for a period of one hour at a temperature of below the boiling point, as for example 195° F. I have found that best results are obtained by using a corn syrup water mix having a concentration of between 10° and 30° Baumé, and preferably about 20° Bé.

The hot corn syrup extraction liquor circulating through the pulverized coffee, extracts both the soluble coffee solids and the volatile flavor and aroma constituents to a large extent, and after extraction has been properly effected at this stage the extraction liquor containing the coffee components is drawn into a vacuum pan 5.

Into the wet mass of coffee remaining in the percolator 1 is now run another 120 lbs. of extraction liquor from tank 2. This extraction liquor displaces the heavy residual extract remaining in the pulverized coffee mass and this liquor is drawn off and combined with the original extraction liquor in the vacuum pan 5. The Baumé of the combined extracts is approximately now 23° at 100° F.

Vacuum and heat are then applied to the vacuum pan 5 and evaporation proceeds until the liquor reaches a Baumé of about 43°. The heavy liquor corn syrup containing the soluble and volatile coffee components is then drawn off to a dehydrator 6 where it is boiled under a high vacuum of one and one-half inches of mercury or less whereupon it expands into a cellular mass which has mainly intercommunicating cells which can be thoroughly dried and pulverized in a process described in the copending applications of Wilbert A. Heyman, Serial No. 351,265 and 381,061.

The moisture content is reduced by this expansion and dehydration process to a point below 5% and preferably on the order of 1%. The ratio of corn syrup solids to coffee extract solids is approximately seven to one.

The pulverized residual coffee mass in percolator 1 is then treated with 320 lbs. of fresh water by percolation, which extracts additional soluble coffee constituents. This extract is then drawn off into tank 2 and to this extract is added 150 lbs. of 43 Bé. corn syrup and about 20 lbs. of water to bring the Baumé of this combined liquor to approximately 20° Baumé at 100° F.

This extraction liquor is then used on 100 lbs. of pulverized coffee which has been placed in percolator 7, the extraction liquor being passed through the coffee in this percolator for a period of one hour at 195° F. by the pump 8.

The corn syrup extraction liquor containing the soluble and volatile coffee constituents is then drawn off into the vacuum pan 5 and to that is added a second extraction liquor as was previously described in connection with the description of the operation in percolator 1. The combined extract is then concentrated in the vacuum pan 5 and then delivered to the dehydrator 6 where it is then dehydrated and expanded to solid form. I have found that the corn syrup mix most effective for accomplishing my objects is 20° Baumé.

It will be obvious that any number of percolators may be used. By the process here set forth the soluble and volatile constituents of the coffee are extracted in such a manner as to obtain a substantial proportion of these constituents of the pulverized coffee and in such a way that because of the low vapor pressure and the low heat employed a relatively large proportion of volatile flavor and aroma constituents are retained. The retention of these constituents is facilitated by the reducing sugars contained in the corn syrup which is an important component of the extraction liquor. These reducing sugars fix the volatile flavor and aroma constituents.

By employing the coffee washings of the previous run in forming the new extraction liquor for each subsequent run optimum results are obtained. The greatest proportion of coffee constituents is obtained and retained.

It will be noted that the process here set forth is primarily based upon (1) the use of corn syrup as an important component of the extraction medium whereby the vapor pressure is reduced, which, in turn, reduces the losses of the desirable volatile constituents (2) the reducing sugars contained in the corn syrup are in contact with the flavor and aroma constituents of the coffee during the extraction and hence are in a position to best fix and retain these constituents (3) the liquid corn syrup containing as it does a relatively small proportion of water greatly reduces the amount of evaporation necessary, which, in turn, prevents loss of the volatile constituents by evaporation, and (4) the corn syrup used in the extraction medium serves as the base for the expansion and dehydration process which is used to convert the coffee extract to solid form.

The cyclic or counter current process described obtains the maximum strength of the coffee components in the extraction liquor while reducing the amount of evaporation necessary for concentration and makes the process efficient, economical and continuous.

It will be understood that the examples and description of the process above set forth relate to a particular method utilizing the present invention. The various modifications within the scope of this invention will be obvious to those skilled in the art from the principles above set forth.

I claim:

1. The process of manufacturing solid dehydrated coffee which comprises extracting the coffee constituents of ground coffee with a corn syrup solution and dehydrating the resulting coffee corn syrup mix.

2. The process of manufacturing solid dehydrated coffee which comprises mixing corn syrup and water, extracting by percolation the soluble coffee constituents of ground coffee and dehydrating the resulting coffee corn syrup mix under heat and vacuum.

3. The process of manufacturing solid dehydrated coffee which comprises extracting the soluble coffee constituents of ground coffee with aqueous corn syrup and dehydrating the resulting coffee corn syrup mix, rewashing the remaining ground coffee with aqueous corn syrup and using the aqueous corn syrup wash thus obtained as a medium for extracting the soluble coffee constituents of a second bath of ground coffee.

4. In the process of making a dehydrated coffee with high volatile flavor content, the step of extracting soluble coffee constituents from ground coffee with aqueous corn syrup which has been passed over ground coffee from which the soluble coffee constituents have been previously substantially extracted.

5. The process of manufacturing solid dehydrated coffee which comprises extracting soluble coffee constituents from ground coffee with aqueous corn syrup having a concentration of about 20° Bé. and dehydrating the resulting coffee corn syrup mix.

6. The process of manufacturing solid dehydrated coffee which comprises extracting soluble coffee constituents from ground coffee with aqueous corn syrup having a concentration of about 20° Bé. and passing a second batch of aqueous corn syrup through the spent ground coffee, combining the first batch and the second batch of aqueous corn syrup containing soluble coffee constituents and dehydrating the resulting coffee corn syrup mix.

WALTER R. FETZER.